J. MICHITSCH.
CLOTHES LINE CLAMP AND REGULATOR.
APPLICATION FILED JUNE 17, 1911.
1,004,890.
Patented Oct. 3, 1911.
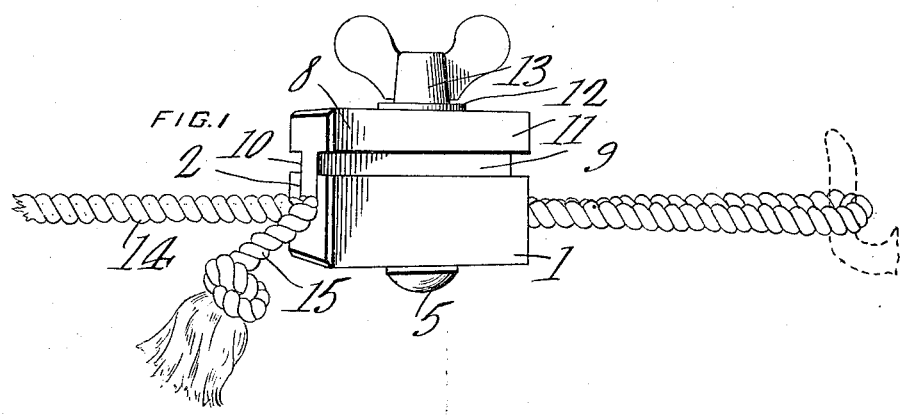
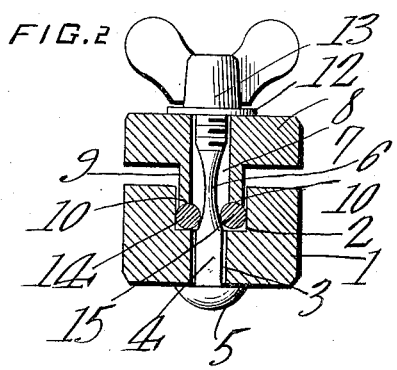
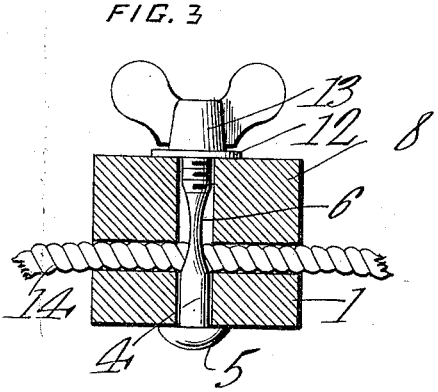
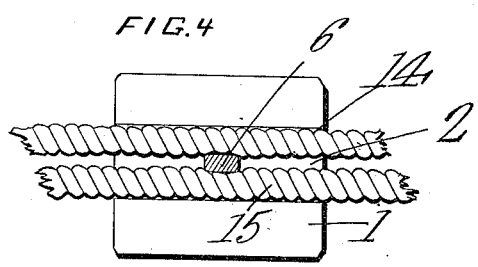
Witnesses
Joseph Michitsch,
Inventor

UNITED STATES PATENT OFFICE.

JOSEPH MICHITSCH, OF THOMASTON, CONNECTICUT.

CLOTHES-LINE CLAMP AND REGULATOR.

1,004,890.     Specification of Letters Patent.     Patented Oct. 3, 1911.

Application filed June 17, 1911. Serial No. 633,772.

*To all whom it may concern:*

Be it known that I, JOSEPH MICHITSCH, a citizen of the United States, residing at Thomaston, in the county of Litchfield and State of Connecticut, have invented a new and useful Clothes-Line Clamp and Regulator, of which the following is a specification.

This invention relates to improvements in a clothes line clamp and regulator, the object of the invention being the provision of a clamping device adapted to clamp the terminals of a line to a hook or other object, whereby the same may be operated to tighten the line and take up the slack or to release the line to reduce the tautness.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a perspective view of the clamp and regulating device in operable relation with the terminals of a rope. Fig. 2 is a cross section taken transversely of the clamping device in operable position. Fig. 3 is a longitudinal section thereof. Fig. 4 is a top plan view of the female section of the clamping device with the bolt in section.

Referring to the drawings, the numeral 1 designates the female member of the clamping device provided with the longitudinally and centrally disposed slot or receptacle 2, provided with the centrally arranged vertical opening or aperture 3, for the reception of the smooth portion 4 of the bolt 5, the head of the bolt being adapted to abut the under side of the female member 1. The central portion of the bolt 5 is provided with the reduced portion 6 caused by the cutting away of the opposite sides of the bolt at this point, this portion of the bolt with its threaded end passing upwardly through the cylindrical channel 7 of the male member 8 of the clamping device, this male member being provided with a longitudinally disposed projection or strip 9 having the two parallel grooves or recesses 10. To clamp the two members in operable relation, around the rope end portions, the bolt where it projects through and above the member 8, is provided with a washer 12 and a winged thumb nut 13.

Mounted within the longitudinal receptacle 2 of the female member are the two strands 14 and 15 of a cable or rope 11, these strands passing so that the curved portions 10, of the longitudinal strip 9 of the male member 8, will be drawn tightly downwardly upon the said strands 14 and 15 and thereby clamp the same within the longitudinal slot 2 and against the curved sides of the bolt, as clearly indicated in Fig. 2 of the drawings.

By this means it will be seen that to adjust the rope it is simply necessary to release the winged nut 13 so that the terminals of the rope within the slot 2 and below the longitudinal projection 9 of the member 8, may be slid along so as to either tighten the rope or loosen it as may be desired.

By constructing a clamp and regulating device as herein set forth, the parts thereof are prevented from any lateral movement after the projection 9 is fitted within the slot 2 and the portions of the rope therein are of a sufficient length to produce the proper clamping effect without in any way cutting or endangering the threads of the rope.

What is claimed is:

A rope clamp, comprising a male and a female member, the female member being provided with a longitudinally disposed slot rectangular in cross section therein and having a cylindrical bore centrally thereof and in communication with the slot, said male member being provided with a longitudinally disposed rectangular in cross section shaped projection adapted to fit in the slot of the female member and clamp two strands of rope therein, the lower face of the projection having rope engaging grooves throughout its length and in parallel, said male member being provided with a cylindrical bore adapted to aline with the cylindrical bore of the female member, and a clamping bolt passing through the cylindrical bores of the respective members and provided with oppositely disposed cut away portions providing a centrally disposed reduced portion in the bolt.

In testimony that I claim the foregoing as my own, I have hereto affixed my signature in the presence of two witnesses.

JOSEPH MICHITSCH.

Witnesses:
 JOHN J. FAIX,
 JOSEPH F. MICHITSCH, Jr.